United States Patent
Li

(10) Patent No.: US 10,698,705 B2
(45) Date of Patent: Jun. 30, 2020

(54) METHOD AND DEVICE FOR MANAGING VIRTUAL DESKTOPS VIRTUALIZED BY A HOST SERVER AND ALLOCATED TO TERMINAL USERS, AND VIRTUAL DESKTOP SERVER

(71) Applicant: ZTE CORPORATION, Shenzhen, Guangdong Province (CN)

(72) Inventor: Lili Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 394 days.

(21) Appl. No.: 15/311,521

(22) PCT Filed: Aug. 7, 2014

(86) PCT No.: PCT/CN2014/083928
§ 371 (c)(1),
(2) Date: Nov. 16, 2016

(87) PCT Pub. No.: WO2015/176395
PCT Pub. Date: Nov. 26, 2015

(65) Prior Publication Data
US 2017/0083347 A1    Mar. 23, 2017

(30) Foreign Application Priority Data

May 22, 2014    (CN) .......................... 2014 1 0219492

(51) Int. Cl.
*G06F 9/451*    (2018.01)
*G06F 9/455*    (2018.01)

(52) U.S. Cl.
CPC .............. *G06F 9/452* (2018.02); *G06F 9/455* (2013.01)

(58) Field of Classification Search
None
See application file for complete search history.

(56) References Cited

U.S. PATENT DOCUMENTS

| 8,028,020 | B2 * | 9/2011 | Huck | ..................... G06Q 10/10 709/204 |
| 2012/0054640 | A1 * | 3/2012 | Nancke-Krogh | ..... G06F 9/4843 715/751 |

(Continued)

FOREIGN PATENT DOCUMENTS

| CN | 102413150 A | 4/2012 |
| CN | 103414712 A | 11/2013 |

(Continued)

OTHER PUBLICATIONS

Adapting Pervasive Learning Technologies to Machine Vision Course; Chi N. Thai, University of Georgia; Biological & Agricultural Engineering Department; Athens, GA 30602-4435; XP055364630A.

*Primary Examiner* — Eric C Wai
(74) *Attorney, Agent, or Firm* — Knobbe, Martens, Olson & Bear, LLP

(57) ABSTRACT

A virtual desktop processing method and device, and a virtual desktop server (60), herein the method includes: establishing a virtual desktop control group, herein the virtual desktop control group includes a control desktop and one or more controlled desktop group members (S102); receiving an instruction for delivering a predetermined image to the one or more controlled desktop group members from the control desktop (S104); and delivering the predetermined image to the one or more controlled desktop group members according to the instruction (S106). By adopting the method, the problems that the virtual desktop is not suitable for scenarios that multi-user interacts to use and the user experience is poor since desktops are independently controlled in the related art are solved, such that one virtual desktop can display the predetermined image to one or more virtual desktops and the demands of specific scenarios on the virtual desktops are satisfied.

15 Claims, 6 Drawing Sheets

(56) References Cited

U.S. PATENT DOCUMENTS

2013/0093776 A1     4/2013    Chakraborty et al.
2014/0129683 A1     5/2014    Flagg et al.

FOREIGN PATENT DOCUMENTS

| CN | 103491188 A | 1/2014 |
| CN | 103797461 A | 5/2014 |
| WO | WO2012083707 A1 | 6/2012 |

* cited by examiner

METHOD AND DEVICE FOR MANAGING VIRTUAL DESKTOPS VIRTUALIZED BY A HOST SERVER AND ALLOCATED TO TERMINAL USERS, AND VIRTUAL DESKTOP SERVER

TECHNICAL FIELD

The present document relates to the field of communication, in particular to a virtual desktop processing method and device, and a virtual desktop server.

BACKGROUND OF THE RELATED ART

With the rapid development of cloud computing service, the cloud virtual desktop technology has already been widely applied in scenarios such as operators, governments, enterprises and schools and so on. The cloud virtual desktop technology includes self-established private clouds and operable public clouds. Virtual Desktop Infrastructure VDI realizes functions such as abstraction of hardware, allocation, scheduling and management of resources and isolations between a virtual desktop and a host operating system and between a plurality of virtual desktops through server virtualization. Through protocols, a thin client end and a server end can display desktop images. At present, typical implementation (which basically becomes de facto standards) includes Citrix XenDesktop, VMware View, etc.

However, in the related art, when a user uses a virtual desktop, imaging user operations through independent desktops is still dominant. However, the virtual desktop is not suitable for scenarios that multi-user interacts to use and the user experience is poor since desktops are independently controlled.

SUMMARY

The present document provides a virtual desktop processing method and device and a virtual desktop server, in order to at least solve the problems that the virtual desktop is not suitable for scenarios that multi-user interacts to use and the user experience is poor since desktops are independently controlled in the related art.

According to one embodiment of the present document, the present document provides a virtual desktop processing method, including: establishing a virtual desktop control group, herein the virtual desktop control group includes a control desktop and one or more controlled desktop group members; receiving an instruction for delivering a predetermined image to the one or more controlled desktop group members from the control desktop; and delivering the predetermined image to the one or more controlled desktop group members according to the instruction.

Alternatively, the predetermined image includes at least one of the following: an image of the control desktop, an image of the controlled desktop and a locally pre-stored image.

Alternatively, delivering the predetermined image to the one or more controlled desktop group members according to the instruction includes: when the predetermined image is the image of the control desktop, delivering the image of the control desktop acquired according to the instruction to all controlled desktop group members in the desktop control group; when the predetermined image is the image of one controlled desktop in the plurality of controlled desktop group members, delivering the image of the controlled desktop acquired according to the instruction to all other controlled desktop group members except the controlled desktop in the desktop control group members; and when the predetermined image is the locally pre-stored image and that a predetermined delivery condition is satisfied is determined, delivering the locally pre-stored image to members in the desktop control group corresponding to the predetermined delivery condition.

Alternatively, after delivering the predetermined image to the one or more controlled desktop group members according to the instruction, the method further includes: releasing an operation right for operating the predetermined image to the one or more controlled desktop group members.

Alternatively, after releasing an operation right for operating the predetermined image to the one or more controlled desktop group members, the method further includes: acquiring an operation image that the one or more controlled desktop image group members granted the operation right perform an operation on the predetermined image; and transmitting the acquired operation image to the one or more controlled desktop group members.

According to another embodiment of the present document, the present document provides a virtual desktop processing device, including: an establishment module configured to establish a virtual desktop control group, herein the virtual desktop control group includes a control desktop and one or more controlled desktop group members; a receiving module configured to receive an instruction for delivering a predetermined image to the one or more controlled desktop group members from the control desktop; and a delivery module configured to deliver the predetermined image to the one or more controlled desktop group members according to the instruction.

Alternatively, the delivery module includes: a first delivery unit configured to, when the predetermined image is an image of the control desktop, deliver the image of the control desktop acquired according to the instruction to all controlled desktop group members in the desktop control group;

a second delivery unit configured to, when the predetermined image is an image of one controlled desktop in the plurality of controlled desktop group members, deliver the image of the controlled desktop acquired according to the instruction to all other controlled desktop group members except the controlled desktop in the desktop control group members; and a third delivery unit configured to, when the predetermined image is a locally pre-stored image and that a predetermined delivery condition is satisfied is determined, deliver the locally pre-stored image to members in the desktop control group corresponding to the predetermined delivery condition.

Alternatively, the device further includes: a release module configured to release an operation right for operating the predetermined image to the one or more controlled desktop group members.

Alternatively, the device further includes: an acquisition module configured to acquire an operation image that the one or more controlled desktop image group members granted the operation right perform an operation on the predetermined image; and a transmission module configured to transmit the acquired operation image to the one or more controlled desktop group members.

According to another embodiment of the present document, the present document provides a virtual desktop server, including the device which is any one of the above-mentioned device.

In the present document, a virtual desktop control group is established, herein the virtual desktop control group includes a control desktop and one or more controlled desktop group members; an instruction for delivering a predetermined image to the one or more controlled desktop group members is received from the control desktop; and the predetermined image is delivered to the one or more controlled desktop group members according to the instruction. Through the present document, the problems that the virtual desktop is not suitable for scenarios that multi-user interacts to use and the user experience is poor since desktops are independently controlled in the related art are solved, such that one virtual desktop can display the predetermined image to one or more virtual desktops and the demands of specific scenarios on the virtual desktops are satisfied.

BRIEF DESCRIPTION OF DRAWINGS

The drawings described here are used for providing further understanding about the present document and constitute part of the present application. The exemplary embodiments of the present document and the description thereof are used for explaining the present document and do not constitute an improper limitation of the present document. In the drawings.

SPECIFIC EMBODIMENTS

The present document will be described below in detail with reference to the drawings in combination with the embodiments. It needs to be stated that the embodiments in the present application and the features in the embodiments may be mutually combined under the situation of no conflict.

Figure 1:
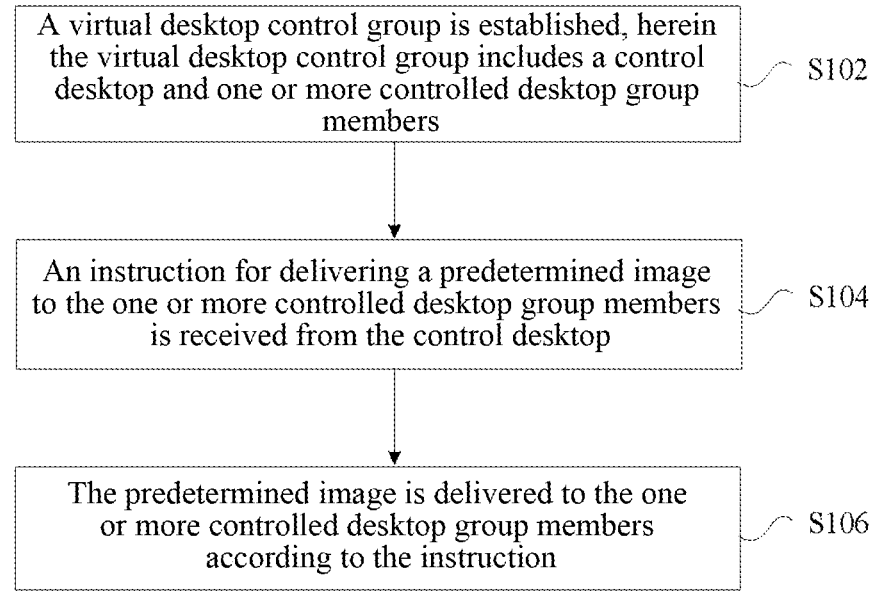
FIG. 1 illustrates a flowchart of a virtual desktop processing method according to the embodiment of the present document.

This embodiment provides a virtual desktop processing method. FIG. 1 illustrates a flowchart of a virtual desktop processing method according to the embodiment of the present document. As illustrated in FIG. 1, the flowchart includes the following steps:

In step S102, a virtual desktop control group is established, herein the virtual desktop control group includes a control desktop and one or more controlled desktop group members.

In step S104, an instruction for delivering a predetermined image to the one or more controlled desktop group members is received from the control desktop, herein the predetermined image may be various, and for example, may be at least one of the following: an image of the control desktop, an image of the controlled desktop and a locally pre-stored image of the virtual desktop. It needs to be stated that the above-mentioned images may be images, may also be audios and may also be video images.

In step S106, the predetermined image is delivered to the one or more controlled desktop group members according to the instruction.

Through the steps, by establishing the virtual desktop control group in the virtual desktop system, the virtual desktops of the virtual desktop control group can interact the predetermined images displayed by the virtual desktops. In the related art user operations are imaged through independent desktops when a user uses a virtual desktop, and the virtual desktop is not suitable for scenarios that multi-user interacts to use and the user experience is caused to be poor since desktops are independently controlled. Compared to the related art, the processing method is adopted, so that one virtual desktop can display the predetermined image to one or more virtual desktops from a virtualized bottom layer, the demands of specific scenarios on the virtual desktops are satisfied and the user experience is effectively improved to a certain extent.

According to different sources of the predetermined image, the processing is also different when the predetermined image is delivered to one or more controlled desktop group members according to the instruction. For example, when the predetermined image is the image of the control desktop, a virtualization server delivers the image of the control desktop acquired according to the instruction to all controlled desktop group members in the desktop control group from the virtualized bottom layer, i.e., the original images delivered by the original controlled desktops are intercepted and the image of the control desktop is delivered for updating. For another example, when the predetermined image is an image of one controlled desktop in a plurality of controlled desktop group members, the image of the controlled desktop acquired according to the instruction is delivered to all other controlled desktop group members except the controlled desktop in the controlled desktop group members, i.e., the original images delivered by the other controlled desktop group members are intercepted and the image of the controlled desktop is delivered. For another example, when the predetermined image is the locally pre-stored image of the virtual desktop system and that a predetermined delivery condition is satisfied is determined, the locally pre-stored image is delivered to members in the desktop control group corresponding to the predetermined delivery condition. It needs to be stated that the predetermined delivery condition may be set according to specific demands. For example, when the pre-stored image is a certain video resource, the video resource may be set to be played at the time of user desktop powering-on, or at a fixed time, at the time of powering-off or before logging-out, when the used resources such as CPU, internal memory and disk resources in the desktop reach a critical value, or the like. In addition, the members in the desktop control group corresponding to the predetermined delivery condition may be the above-mentioned control desktop and may also be the one or more controlled desktops.

Alternatively, in order to more really perform an interaction between virtual desktops in real time, after the predetermined image is delivered to the one or more control desktop group members according to the instruction, an operation right for operating the predetermined image may be released to the one or more controlled desktop group members. In addition, more alternatively, after the operation right for operating the predetermined image is released to the one or more controlled desktop group members, an operation image that the one or more controlled desktop image group members granted the operation right perform an operation on the predetermined image is acquired; and the acquired operation image is transmitted to the one or more controlled desktop group members. Through such processing, not only can the interaction of the predetermined image to the controlled desktop group members be realized, but also the feedback made by the controlled desktop members according to the received predetermined image can be effectively acquired and the communication between the control desktop and the controlled desktops is effectively realized.

This embodiment further provides a virtual desktop processing device. The device is used for implementing the above-mentioned embodiments and the preferred implementation modes. Since the description has already been made, repetitive description is not made here. As used below, the term "module" may be a combination of software and/or hardware for realizing predetermined functions. Although the device described in the following embodiment is alternatively implemented by means of software, the implementation by means of hardware or the combination of software and hardware is possible and may be conceived.

Figure 2:
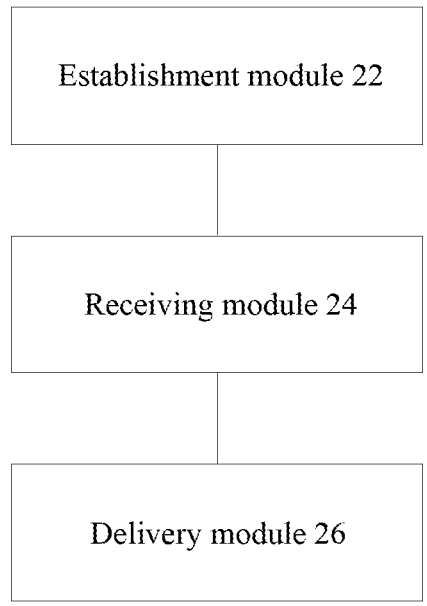
FIG. 2 illustrates a structural diagram of a virtual desktop processing device according to the embodiment of the present document.

FIG. 2 illustrates a structural diagram of a virtual desktop processing device according to the embodiment of the present document. As illustrated in FIG. 2, the device includes an establishment module 22, a receiving module 24 and a delivery module 26. The device will be described below.

The establishment module 22 is configured to establish a virtual desktop control group, herein the virtual desktop control group includes a control desktop and one or more controlled desktop group members. The receiving module 24 connected to the establishment module 22 is configured to receive an instruction for delivering a predetermined image to the one or more controlled desktop group members from the control desktop. The delivery module 26 connected to the receiving module 24 is configured to deliver the predetermined image to the one or more controlled desktop group members according to the instruction.

Figure 3:
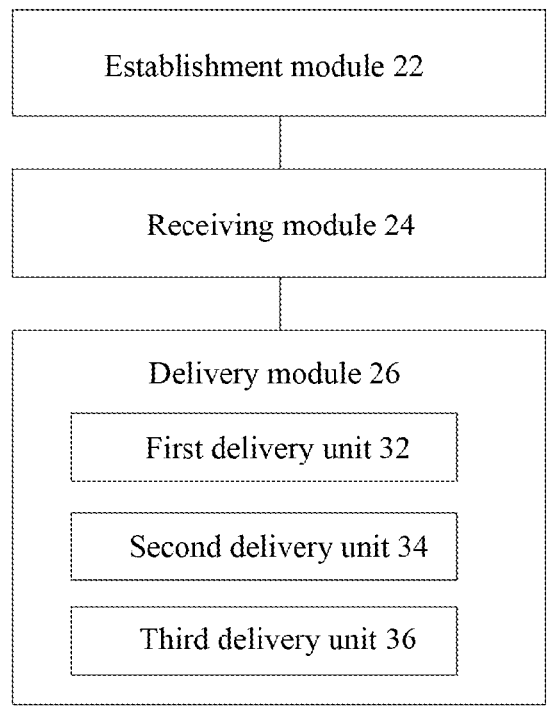
FIG. 3 illustrates a preferred structural diagram of a delivery module 26 in a virtual desktop processing device according to the embodiment of the present document.

FIG. 3 illustrates a preferred structural diagram of a delivery module 26 in a virtual desktop processing device according to the embodiment of the present document. As illustrated in FIG. 3, the delivery module 26 includes at least one of the following: a first delivery unit 32, a second delivery unit 34 and a third delivery unit 36. The delivery module 26 will be described below.

The first delivery unit 32 is configured to, when the predetermined image is an image of the control desktop, deliver the image of the control desktop acquired according to the instruction to all controlled desktop group members in the desktop control group. The second delivery unit 34 is configured to, when the predetermined image is an image of one controlled desktop in a plurality of controlled desktop group members, deliver the image of the controlled desktop acquired according to the instruction to all other controlled desktop group members except the controlled desktop of the desktop control group members. The third delivery unit 36 is configured to, when the predetermined image is a locally pre-stored image and that a predetermined delivery condition is satisfied is determined, deliver the locally pre-stored image to members in the desktop control group corresponding to the predetermined delivery condition.

Figure 4:
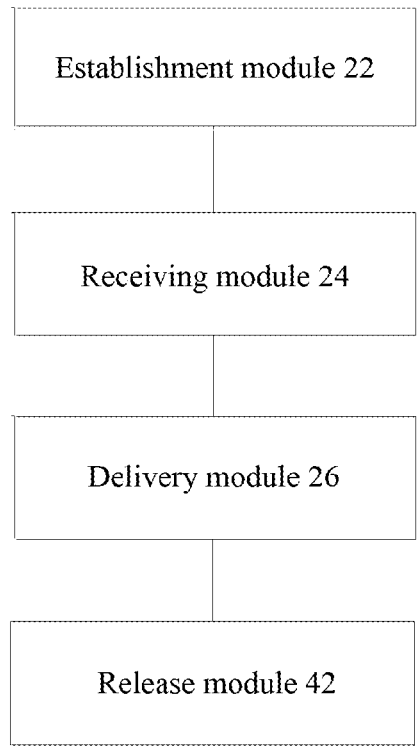
FIG. 4 illustrates a preferred structural diagram 1 of a virtual desktop processing device according to the embodiment of the present document.

FIG. 4 illustrates a preferred structural diagram 1 of a virtual desktop processing device according to the embodiment of the present document. As illustrated in FIG. 4, in addition to all modules illustrated in FIG. 2, the device further includes a release module 42. The release module 42 will be described below.

The release module 42 connected to the delivery module 26 is configured to release an operation right for operating the predetermined image to the one or more controlled desktop group members.

Figure 5:
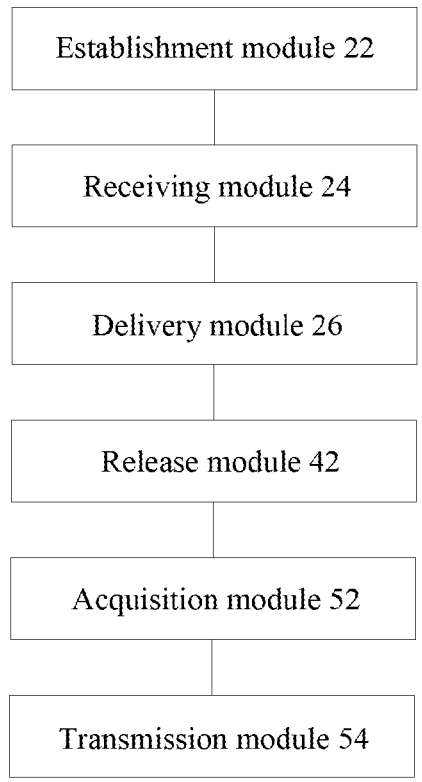
FIG. 5 illustrates a preferred structural diagram 2 of a virtual desktop processing device according to the embodiment of the present document.

FIG. 5 illustrates a preferred structural diagram 2 of a virtual desktop processing device according to the embodiment of the present document. As illustrated in FIG. 4, in addition to all modules illustrated in FIG. 4, the device further includes an acquisition module 52 and a transmission module 54. The device will be described below.

The acquisition module 52 connected to the release module 42 is configured to acquire an operation image that the one or more controlled desktop image group members granted the operation right perform an operation on the predetermined image. The transmission module 54 connected to the acquisition module 52 is configured to transmit the acquired operation image to the one or more controlled desktop group members.

Figure 6:
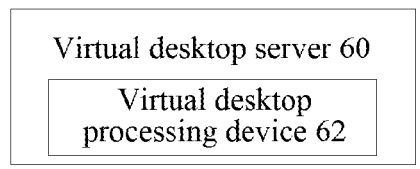
FIG. 6 illustrates a structural diagram of a virtual desktop server according to the embodiment of the present document.

FIG. 6 illustrates a structural diagram of a virtual desktop server according to the embodiment of the present document. As illustrated in FIG. 6, the virtual desktop server 60 includes the virtual desktop processing device 62 which is any one of the above-mentioned.

With respect to the related art in which a single user performs a processing that the desktop is respectively and independently controlled, the related art is not suitable for scenarios of multi-user interactions, e.g., other designated pictures or images cannot be effectively controlled to be played on any one or group of desktops. Under the scenario, the demands cannot be satisfied. For example, in the education industry, a teacher may designate to display a current desktop of the teacher to students in class, and contents on the desktop of the teacher may be viewed on the desktops of the students or a black screen is delivered such that any desktop operation cannot be performed any longer. Based on that, this embodiment provides a processing method for displaying an image on a virtual desktop. In an operation process of a public cloud, by adopting this method, specific images may be transmitted to tenants at any time point according to attribute features of the tenants in the situation that the tenants are online, so as to pertinently deliver information such as notifications and advertisements to increase operation income. Not only can the problems that the existing cloud desktop system in the related art cannot deliver the images in a customized manner to display interfaces of virtual desktops and cannot perform an interaction on display interfaces of virtual desktops under the virtual machine desktop environment be effectively solved, but also the demands of delivering designated display pictures, desktops or videos on user virtual desktops under specific scenarios can be satisfied.

The solution of displaying an image on a virtual desktop will be described below.

Figure 7:
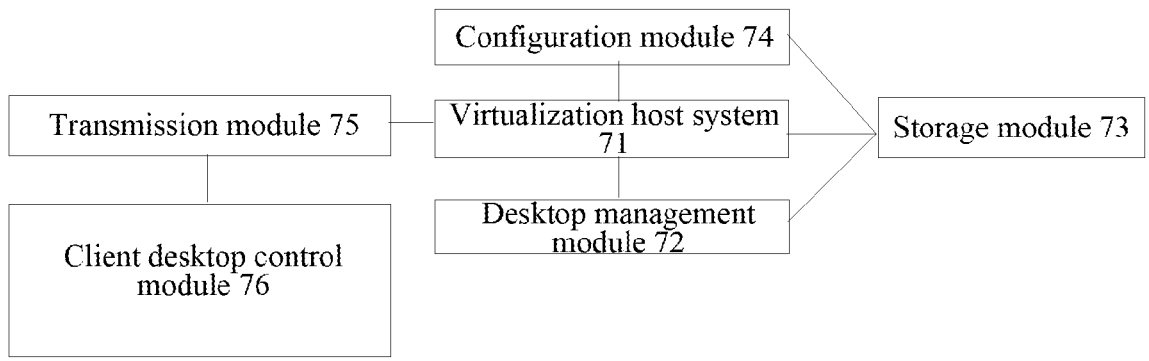
FIG. 7 illustrates a structural diagram of a desktop display system according to the embodiment of the present document.

FIG. 7 illustrates a structural diagram of a desktop display system according to the embodiment of the present document. As illustrated in FIG. 7, the structure includes a virtualization host system 71, a desktop management module 72, a storage module 73, a configuration module 74, a transmission module 75 and a client desktop control module

76. Herein, the virtualization host system 71, the desktop management module 72 and the storage module 73 are basic function modules at a virtual desktop system side. The function of the configuration module 74 is equivalent to the function of the establishment module 22. The functions of the transmission module 75 are equivalent to the functions of the delivery module 26 and the transmission module 56, and the client desktop control module 76 has a basic function of a virtual client side. The desktop display system will be described below.

The virtualization host system 71 is used for providing bottom layer virtualization, and virtualizes a host server into a plurality of logic computers and allocates the plurality of logic computers to terminal users for use as desktops, herein a host agent is installed therein and is used for communication between virtual machines, managing and receiving virtual machine instructions and executing actions. This part is used as a basic part and is not described in detail in the embodiment. However, subsequent desktop use is operated on the virtual machines obtained through virtualization on the basis.

The desktop management module 72 performs basic functions on the virtual machines obtained through virtualization of the bottom layer virtualization host system 71, such as user allocation, use binding, management of life cycles such as powering-on and powering-off of the virtual machines and the like, backup and migration, etc.

The storage module 73 is configured to store operating system data of virtual desktops and user data thereof.

The configuration module 74 provides a configuration portal operable for an administrator, and is configured to configure basic configurations for virtualization system operation, including network, storage, virtualization host and the like, life cycle management of desktops, protection function settings such as backup and disaster recovery and the like, also including settings of user and desktop allocation binding relation, control and controlled policy groups. Herein, what is related to the embodiment is the control and controlled group user members and the operations between the virtual desktops.

The transmission module 75 provides display and device implementation for accessing remote virtual desktops at clients, including transmission protocols, a client and a server. Typical transmission protocols include Spice protocols, Citrix ICA protocols and the like. Herein, the server is integrated in the virtualization host system, the client is installed on terminals used by users and the server communicates with the client through the transmission protocols. Through the module, the desktop images of the users may be mapped to displayers of the users, and audio, mouse, keyboard, peripheral devices and the like may be operated by using local devices.

The client desktop control module 76 is installed on the user terminals, is used for integrating the client transmission protocols of the transmission module and increasing a desktop control function. Whether a desktop is a control desktop or a controlled desktop or a common desktop may be determined according to user attributes.

Based on the above-mentioned desktop display system, the embodiment provides a desktop display processing method. The method mainly includes the following processing: a virtualization host system virtualizes a plurality of desktops which are provided to users for use, herein these desktops may be used as common desktops and may also be used as a control desktop and controlled desktop group in the embodiment. A control user and a plurality of controlled users are set in a controlled group. When the control user uses the desktop, an image, an audio or a certain specially designated image of the desktop of the control user may be delivered to controlled user terminals, the controlled users do not display the desktops of themselves at this moment but display the contents delivered by the control desktop. The control desktop may also release a desktop operation right to a certain controlled user A, at this moment the controlled user A can operate the control desk, and the control desktop may be set as that the control desktop may be operable or inoperable simultaneously. In addition, the control user may also designate to deliver the desktop of a certain controlled user to other controlled users and the control user itself. The control desktop may take back the delivery operation at any time. In addition, the control desktop may also be set to deliver a certain image or video to all desktops in the desktop group at regular time.

The preferred implementation modes of the present document will be described below with reference to the drawings.

Preferred Implementation Mode 1

Figure 8:
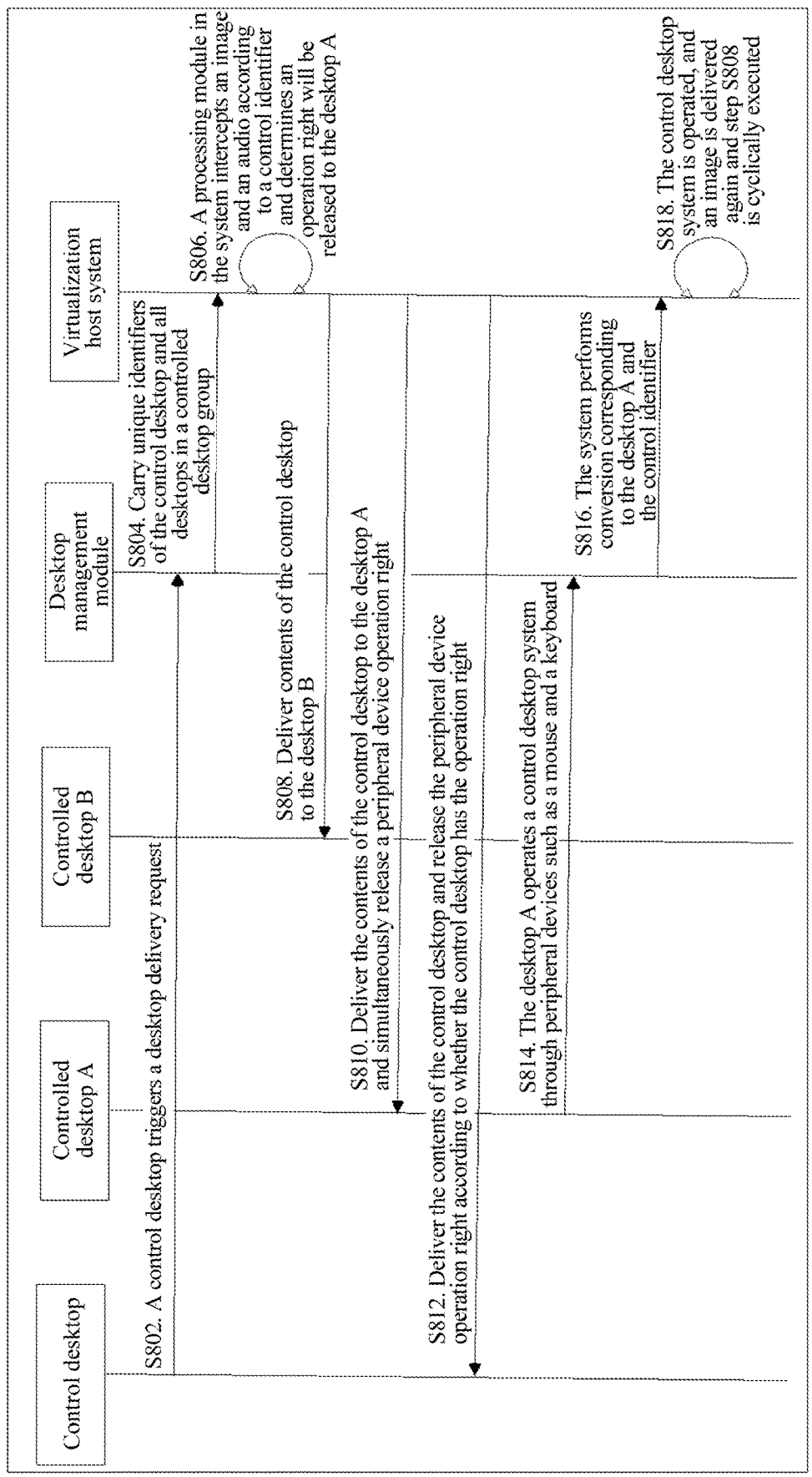
FIG. 8 illustrates a flowchart according to a preferred implementation mode 1 of the present document.

FIG. 8 illustrates a flowchart according to a preferred implementation mode 1 of the present document. As illustrated in FIG. 8, the process includes the following steps. The preferred implementation mode is mainly used for delivering a control desktop to all controlled user desktops. In the preferred implementation mode, description is made by taking that the control desktop releases a desktop image and audio and a peripheral device operation right of the control desktop to a controlled desktop A as an example.

In step S802, a control desktop initiates a desktop delivery request to a desktop management module 72 at a control desktop operation client.

In step S804, the desktop management module 72 acquires controlled desktop information from a desktop management database, including a unique identifier of a desktop, a desktop process number, an IP address and the like to which however the information is not limited, which controlled desktops have already been configured in a configuration module 74.

In step S806, a virtualization host system 71 has an agent process module for processing interaction between a host and virtual machines at the system. In the module, an image and an audio of the control desktop are intercepted at a virtualization server layer according to the identifier of the control desktop, and are delivered to all desktops in a controlled desktop group according to unique identifiers of controlled desktops; and it is to record that a control desktop operation right is released to a controlled desktop A. See the controlled desktop A and the controlled desktop B illustrated in the drawing.

In step S808, the controlled desktop B transmits a control image and audio to the desktop B through transmission module protocols, and the desktop B may use an audio peripheral device, such as earphones or a sound box or the like, to hear sounds played by a control system.

In step S810, the controlled desktop A transmits the control image and audio to the desktop A through the transmission module protocols, and the desktop A may use an audio peripheral device to hear the sounds played by the control system.

In step S812, the control desktop transmits the control image through the transmission module protocols, and according to settings, the control desktop may operate the desktop under situations that the control right is completely released, the control right is simultaneously owned and the control right is not released. If the control right is completely released, peripheral devices such as a mouse and a keyboard and the like cannot be used to operate the desktop. If the control right is simultaneously owned, the control desktop and the controlled desktop A can simultaneously use the peripheral devices such as the mouse and the keyboard and the like to operate the desktop. If the control right is not released, the control desktop only can use the peripheral devices such as the mouse and the keyboard and the like to operate the desktop system. In the embodiment, it is supposed that the control desktop is configured to completely release the control right to the desktop A.

In step S814, the controlled desktop A may operate the control desktop system through the peripheral devices such as the mouse and the keyboard and the like.

In step S816, the desktop management module 74 acquires a unique identifier of the controlled desktop A, determines the controlled desktop group to which the controlled desktop A belongs, acquires a unique identifier of the control desktop and converts the operation of the controlled desktop A into the operation of the control desktop.

In step S818, the control desktop system is operated and changed at a bottom layer. When a changed image and audio are intercepted again, step S808 is cyclically executed.

Figure 9:
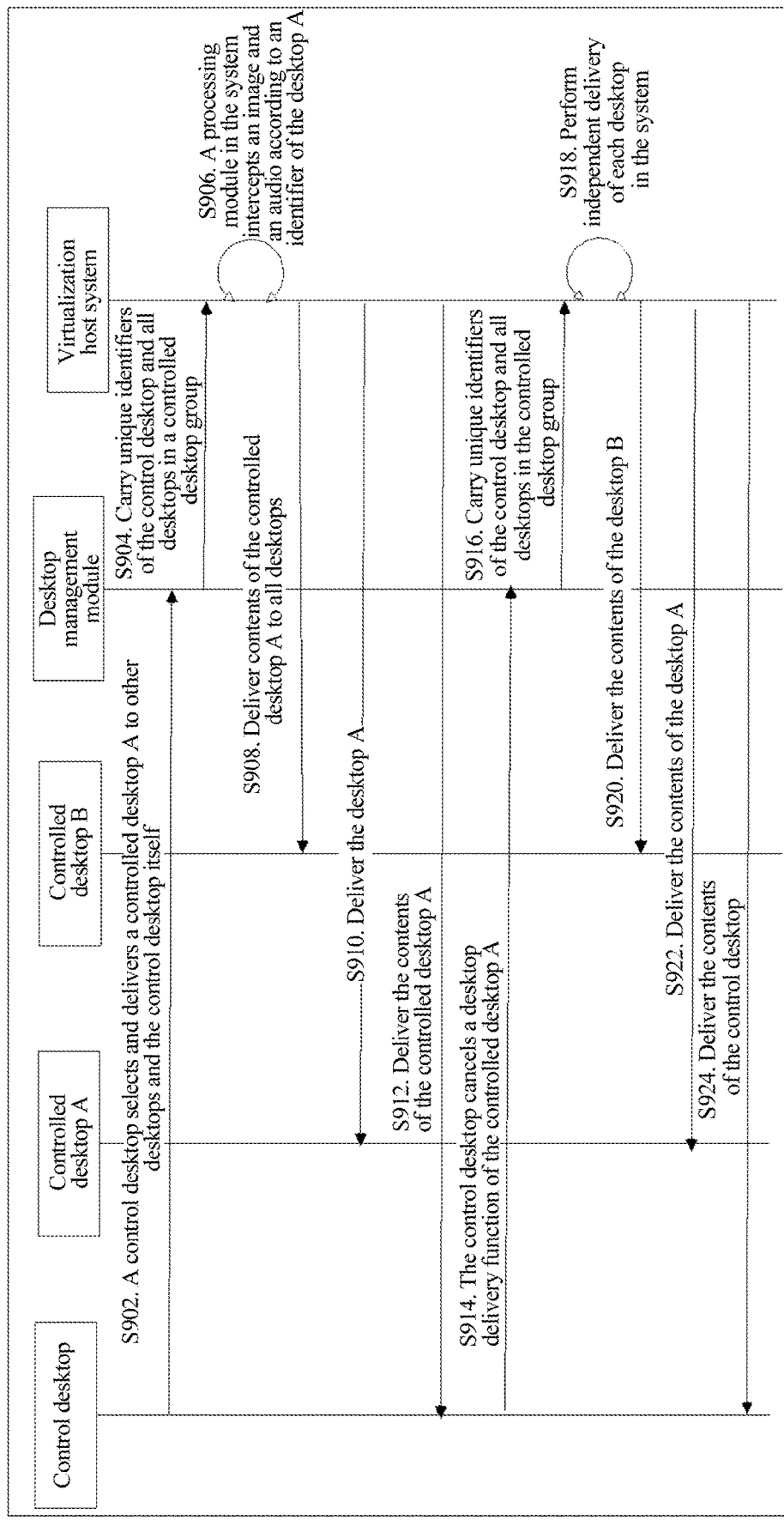
FIG. 9 illustrates a flowchart according to a preferred implementation mode 2 of the present document.

FIG. 9 illustrates a flowchart according to a preferred implementation mode 2 of the present document. As illustrated in FIG. 9, the process includes the following steps. In the preferred implementation mode 2, a control desktop may designate and deliver an image and audio of a certain controlled desktop to all other controlled desktops except the controlled desktop, and selectively the control desktop may be delivered and may also be not delivered.

In step S902, a control desktop selects and delivers a controlled desktop A to other desktops in a desktop group and transmits a request to a desktop management module 72 at a control desktop operation client. Herein, selectively the controlled desktop A may be delivered to the control desktop itself and may not be delivered to the control desktop itself. If the controlled desktop A is delivered to the control desktop itself, the control desktop displays desktop contents of the controlled desktop A. Otherwise, the control desktop still displays the original contents of the control desktop. Here, the controlled desktop A is selected to be delivered to the control desktop.

In step S904, the desktop management module 72 acquires controlled desktop information from a desktop management database, including a unique identifier of a desktop, a desktop process number, an IP address and the like to which however the information is not limited, which the controlled desktop has already been configured in a configuration module 74.

In step S906, a virtualization host system has an agent process module for processing interaction between a host and virtual machines. In the module, a virtualization server intercepts an image and an audio of the controlled desktop A from a bottom layer according to the identifier of the controlled desktop A to deliver to all desktops in a controlled desktop group, including the control desktop, according to unique identifiers of controlled desktops.

In step S908, the controlled desktop transmits an image and audio of the controlled desktop A to a desktop B through transmission module protocols, and the desktop B may use an audio peripheral device such as earphones or a sound box or the like to hear sounds played by a system of the controlled desktop A.

In step S910, the controlled desktop A transmits the desktop image of itself through the transmission module protocols, and the controlled desktop A may still use peripheral devices such as a mouse and a keyboard and the like to operate the desktop of the desktop A.

In step S912, the control desktop transmits the contents of the controlled desktop A to the control desktop through the transmission module protocols.

In step S914, the control desktop may cancel a desktop delivery function of the controlled desktop A and transmit a request to the desktop management module at the client of the control desktop.

In step S916, the desktop management module 72 acquires controlled desktop information from a desktop management database, including a unique identifier of a desktop, a desktop process number, an IP address and the like to which however the information is not limited, which controlled desktops have already been configured in a configuration module 84.

In step S918, the virtualization host system 71 does not perform an intercepting action any longer and directly delivers the original desktop contents corresponding to each unique identifier.

In step S920, the controlled desktop B delivers the desktop contents of the controlled desktop B.

In step S922, the controlled desktop A delivers the desktop contents of the controlled desktop A.

In step S924, the control desktop delivers the desktop contents of the control desktop.

Figure 10:
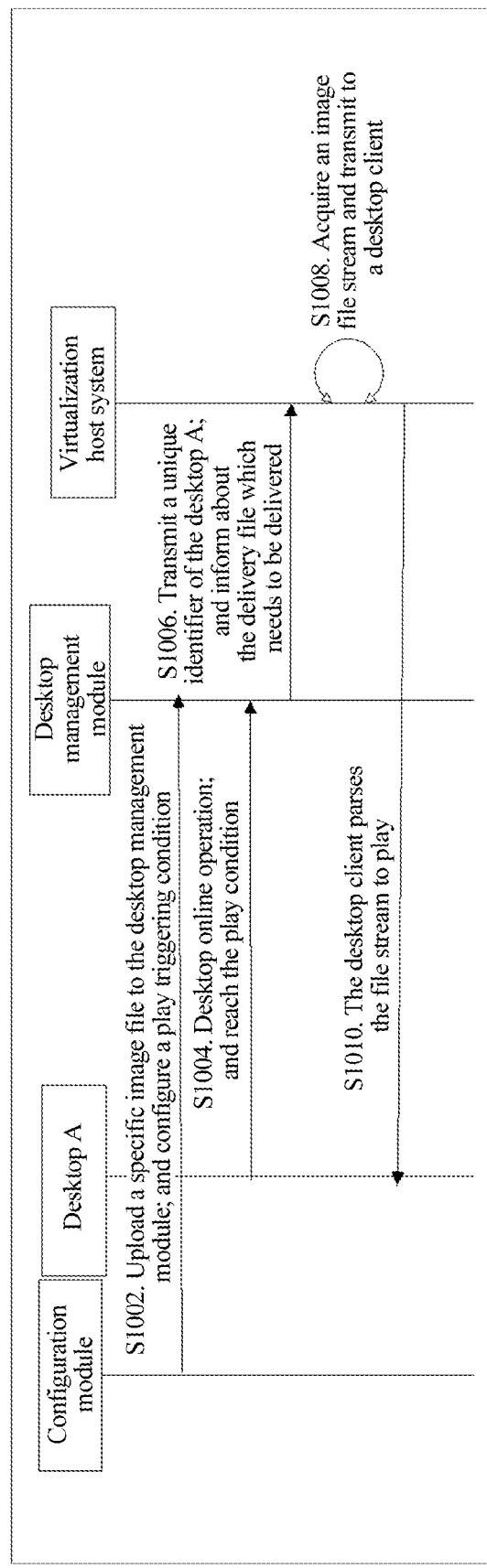
FIG. 10 illustrates a flowchart according to a preferred implementation mode 3 of the present document.

FIG. 10 illustrates a flowchart according to a preferred implementation mode 3 of the present document. The process includes the following steps. In the preferred implementation mode 3, in a configuration module 74, a control desktop may designate and deliver an image and audio of a certain controlled desktop to all other controlled desktops except the controlled desktop, and selectively the control desktop may be delivered and may also be not delivered.

In step S1002, in a configuration module 74, a delivered desktop group is preconfigured and description is made by taking a desktop A as an example here. A file to be played is uploaded in advance to a desktop top management module, herein the file may be a picture, a video and the like. A play policy is set, such as playing during user desktop powering-on, playing at fixed time, playing at powering-off, playing before logging-out, playing when the used resources such as CPU, internal memory and disk resources in the desktop reach a critical value, or the like.

In step S1004, when the desktop A operates online and a triggering condition defined in the configuration module is satisfied, a play event request is triggered and transmitted to a desktop management module 72.

In step S1006, the desktop management module 72 acquires a unique identifier of the desktop A and informs a virtualization host system 81 about that the preset file is to be delivered.

In step S1008, a virtualization host system 71 acquires a preset play file and transmits file contents to the desktop A in the form of a data stream.

In step S1010, the desktop A acquires the transmitted data stream, and a desktop client parses and plays the data stream to complete a delivery process.

Through the embodiments and the preferred implementation modes, by intercepting the desktop or displaying the predetermined image, the demands of numerous specific scenarios on the desktop are better satisfied.

It will be apparent that one skilled in the art should understand that all modules or all steps of the present document may be implemented by using general-purpose computing devices, they may be integrated in a single computing device or distributed on a network consisting of a plurality of computing devices, alternatively they may be implemented by using program codes executable for computing devices, thus they may be stored in memory devices and executed by computing devices, and under certain circumstances, the illustrated or described steps may be executed according to a sequence different from the sequence here, or they may be respectively manufactured into integrated circuit modules or a plurality of modules or steps thereof may be manufactured into a single integrated circuit module to implement. Therefore, the present document is not limited to any specific combination of hardware and software.

The embodiments described above are just preferred embodiments of the present document and are not used for limiting the present document. For one skilled in the art, the present document may have various modifications and variations. Any modification, equivalent replacement, improvement and the like made within the essence and principle of the present document shall be still included in the protection scope of the present document.

INDUSTRIAL APPLICABILITY

The technical solutions provided by the embodiments of the present document can be applied to virtual desktops to solve the problems that the virtual desktop is not suitable for scenarios that multi-user interacts to use and the user experience is poor since desktops are independently controlled in the related art. Thereby, the technical solutions achieve the effects that one virtual desktop can display the predetermined image to one or more virtual desktops and the demands of specific scenarios on the virtual desktops are satisfied.

I claim:

1. A method for managing virtual desktops virtualized by a host server and allocated to terminal users, comprising:
    establishing a virtual desktop control group, wherein the virtual desktop control group comprises a control desktop and one or more controlled desktop group members;
    receiving an instruction for delivering a predetermined image to the one or more controlled desktop group members from the control desktop; and
    delivering the predetermined image to the one or more controlled desktop group members according to the instruction;
    wherein when the predetermined image is an image of one controlled desktop in the plurality of controlled desktop group members, intercepting an original images displayed by all other controlled desktop group members except the controlled desktop in the desktop control group members, and delivering the image of the controlled desktop to all the other controlled desktop group members except the controlled desktop in the desktop control group members;
    wherein the control desktop is selected not to be delivered or to be delivered the image of the controlled desktop.

2. The method according to claim 1, wherein the predetermined image further comprises at least one of the following:
    an image of the control desktop and a locally pre-stored image.

3. The method according to claim 2, wherein delivering the predetermined image to the one or more controlled desktop group members according to the instruction comprises:
    when the predetermined image is the image of the control desktop, delivering the image of the control desktop acquired according to the instruction to all controlled desktop group members in the desktop control group; and
    when the predetermined image is the locally pre-stored image and that a predetermined delivery condition is satisfied is determined, delivering the locally pre-stored image to members in the desktop control group corresponding to the predetermined delivery condition.

4. The method according to claim 3, wherein, after delivering the predetermined image to the one or more controlled desktop group members according to the instruction, the method further comprises:
    releasing an operation right for operating the predetermined image to the one or more controlled desktop group members.

5. The method according to claim 4, wherein, after releasing an operation right for operating the predetermined image to the one or more controlled desktop group members, the method further comprises:
    acquiring an operation image that the one or more controlled desktop image group members granted the operation right perform an operation on the predetermined image; and
    transmitting the acquired operation image to the one or more controlled desktop group members.

6. The method according to claim 2, wherein, after delivering the predetermined image to the one or more controlled desktop group members according to the instruction, the method further comprises:
    releasing an operation right for operating the predetermined image to the one or more controlled desktop group members.

7. The method according to claim 6, wherein, after releasing an operation right for operating the predetermined image to the one or more controlled desktop group members, the method further comprises:
    acquiring an operation image that the one or more controlled desktop image group members granted the operation right perform an operation on the predetermined image; and
    transmitting the acquired operation image to the one or more controlled desktop group members.

8. The method according to claim 1, wherein, after delivering the predetermined image to the one or more controlled desktop group members according to the instruction, the method further comprises:
    releasing an operation right for operating the predetermined image to the one or more controlled desktop group members.

9. The method according to claim 8, wherein, after releasing an operation right for operating the predetermined image to the one or more controlled desktop group members, the method further comprises:
    acquiring an operation image that the one or more controlled desktop image group members granted the operation right perform an operation on the predetermined image; and
    transmitting the acquired operation image to the one or more controlled desktop group members.

10. A device for managing virtual desktops virtualized by a host server and allocated to terminal users, comprising a processor and a storage device, wherein the storage device stores a processor-executable program executed by the processor, and the program comprises:

an establishment module configured to establish a virtual desktop control group, wherein the virtual desktop control group comprises a control desktop and one or more controlled desktop group members;

a receiving module configured to receive an instruction for delivering a predetermined image to the one or more controlled desktop group members from the control desktop; and a delivery module configured to deliver the predetermined image to the one or more controlled desktop group members according to the instruction;

wherein the delivery module comprises a second delivery unit configured to, when the predetermined image is an image of one controlled desktop in the plurality of controlled desktop group members, intercept an original images displayed by all other controlled desktop group members except the controlled desktop in the desktop control group members, and deliver the image of the controlled desktop to all the other controlled desktop group members except the controlled desktop in the desktop control group members;

wherein the control desktop is selected not to be delivered or to be delivered the image of the controlled desktop.

11. The device according to claim 10, wherein the delivery module further comprises:

a first delivery unit configured to, when the predetermined image is an image of the control desktop, deliver the image of the control desktop acquired according to the instruction to all controlled desktop group members in the desktop control group; and a third delivery unit configured to, when the predetermined image is a locally pre-stored image and that a predetermined delivery condition is satisfied is determined, deliver the locally pre-stored image to members in the desktop control group corresponding to the predetermined delivery condition.

12. The device according to claim 11, wherein the device further comprises:

a release module configured to release an operation right for operating the predetermined image to the one or more controlled desktop group members.

13. The device according to claim 10, wherein the device further comprises:

a release module configured to release an operation right for operating the predetermined image to the one or more controlled desktop group members.

14. The device according to claim 13, wherein the device further comprises:

an acquisition module configured to acquire an operation image that the one or more controlled desktop image group members granted the operation right perform an operation on the predetermined image; and a transmission module configured to transmit the acquired operation image to the one or more controlled desktop group members.

15. A virtual desktop server, comprising the device according to claim 10.

* * * * *

UNITED STATES PATENT AND TRADEMARK OFFICE
CERTIFICATE OF CORRECTION

PATENT NO. : 10,698,705 B2
APPLICATION NO. : 15/311521
DATED : June 30, 2020
INVENTOR(S) : Lili Li Page 1 of 1

It is certified that error appears in the above-identified patent and that said Letters Patent is hereby corrected as shown below:

In the Specification

Column 2, Lines 17-18, delete "right perform" and insert --right to perform--.

Column 2, Line 58, delete "right perform" and insert --right to perform--.

Column 5, Line 8, delete "right perform" and insert --right to perform--.

Column 6, Line 22, delete "right perform" and insert --right to perform--.

In the Claims

Column 12, Line 25, Claim 5, delete "right perform" and insert --right to perform--.

Column 12, Line 42, Claim 7, delete "right perform" and insert --right to perform--.

Column 12, Line 59, Claim 9, delete "right perform" and insert --right to perform--.

Column 14, Line 22, Claim 14, delete "right perform" and insert --right to perform--.

Signed and Sealed this
Twenty-second Day of December, 2020

Andrei Iancu
*Director of the United States Patent and Trademark Office*